INVENTOR
WALTER P. KISTLER

BY

ATTORNEYS.

Oct. 24, 1967          W. P. KISTLER                3,349,259
                PIEZOELECTRIC PRESSURE TRANSDUCER
Filed May 27, 1965                              2 Sheets-Sheet 2

INVENTOR
WALTER P. KISTLER

BY

ATTORNEYS 3,349,259
PIEZOELECTRIC PRESSURE TRANSDUCER
Walter P. Kistler, Clarence, N.Y., assignor to Kistler Instrument Corporation, Clarence, N.Y., a corporation of New York
Filed May 27, 1965, Ser. No. 459,242
14 Claims. (Cl. 310—8.7)

This invention relates to a pressure transducer of the piezoelectric type and more particularly to an acceleration and/or temperature compensated quartz crystal transducer for sensing changes in the pressure which may accompany explosions, elevated temperatures, and other changes in environmental surroundings.

Piezoelectric pressure transducers have been known for many years, and a wide variety of such transducers are presently commercially available. Some use ceramic elements such as barium titanate and the like, while others utilize piezoelectric sensitive quartz crystals. Piezoelectric pressure transducers have the advantages of fast response, wide dynamic range, and are in general less sensitive to the influence of temperature variations as compared with inductive, capacitive, or strain gage transducers. However, one of the major limitations of the piezoelectric transducers is their sensitivity to acceleration and vibrations, due largely to the mass of the conventional pressure sensitive column including the diaphragm, base and piezoelectric plates forming what is conventionally called the piezoelectric module.

Several arrangements have been suggested and used to compensate for this acceleration and vibration sensitivity of piezoelectric pressure transducers. In general, they all rely on the concept of compensating the part of the signal due to acceleration or vibration by adding an element to the transducer that is sensitive to acceleration only. This added element is usually coupled electrically in series and so arranged that the signal it generates is equal and opposite to the acceleration or vibration component of the remaining portion of the transducer. For example, it is known to utilize two quartz elements (or stacks of elements) which are identical in mass and are so connected that when the entire transducer is accelerated in its axial direction the positive and negative signals of the two piezoelectric elements cancel each other while only the front element receives the pressure or force signal.

In previous double piezoelectric element constructions, the transducers have possessed a serious basic limitation severely reducing their usefulness due to the fact that the pressure sensitive and acceleration sensitive element or elements have been separated by a structural member. As a result, the two elements are not reached simultaneously by vibrations at the higher frequencies so that there is a very substantial phase difference between the responses of the pressure sensitive element on the one hand and the response of the acceleration compensating element on the other. As a result the two acceleration signals do not perfectly compensate at the higher frequencies.

In another known arrangement two quartz elements are connected mechanically and electrically in series with the piezo modulus of the rear or compensating element tuned by varying the cutting direction such that in the case of acceleration the positive signal produced in the first element is compensated in the second element by a negative signal (or vice versa). This tuned arrangement is not very practical in that it is difficult and time consuming to produce piezoelectric plates or crystals whose modulus is made smaller by varying the cutting direction in steps so that it corresponds to the optimum state.

The present invention avoids the above mentioned difficulties by providing a novel piezoelectric crystal stack assembly wherein the front and rear piezoelectric elements are not joined by an intermediate structural element but rather the entire unit acts in the manner of a single mass when subjected to acceleration or vibration forces. As a result, the transducer of this invention may be used over a wide frequency range without evidencing the phase problems of prior constructions, especially at higher frequencies. At the same time, all of the crystals of the present invention are provided with a standard piezo modulus which completely eliminates the need for special crystal cuts and substantially reduces the complications and cost of the device. In the present invention the two quartz units or stacks are incorporated in a single module and are separated by a relatively large seismic mass such that the seismic forces (acceleration and vibration forces) acting on the second or compensating unit are much greater for a given acceleration. In this way a fewer number of quartz elements in the compensating stack may be used to cancel out or nullify the acceleration and vibration response of the pressure sensing elements. However, due to the lesser number of compensating plates the pressure responsive signal generated in the forward group of piezoelectric elements is not completely cancelled out but may be utilized as an output signal.

In addition, important features of the present invention include the provision of temperature compensating buffer elements or masses which are used to minimize error signals conventionally generated in piezoelectric transducers due to temperature changes. These temperature compensating elements are chosen to have a modulus of expansion as a function of temperature which complements that of the piezoelectric elements and the other elements of the module so as to reduce and minimize strain forces normally accompanying expansion and contraction of the piezoelectric elements when subjected to changing temperatures.

It is therefore one object of the present invention to provide a novel and improved piezoelectric pressure transducer.

Another object of the invention is to provide an acceleration compensated piezoelectric transducer.

Another object of the present invention is to provide a temperature compensated piezoelectric transducer.

Another object of the present invention is to provide a piezoelectric pressure transducer having both acceleration and temperature compensation.

Another object of the present invention is to provide a piezoelectric transducer exhibiting a rapid response, wide frequency range, and improved stability when subjected to varying environmental conditions.

Another object of the present invention is to provide a piezoelectric transducer of the stacked quartz crystal type where the transducer is provided with both a pressure sensitive stack of crystals and a second acceleration compensating stack of crystals. The crystals are arranged in a single quartz crystal module and separated by a seismic mass such that the output signal due to acceleration of the primary or pressure sensing stack of elements is compensated by the opposite polarity signal of the lesser number of acceleration compensating elements. This is accomplished by means of an arrangement of seismic masses in the module such that for a given acceleration $g$ the forces acting on the small stack are greater than those acting on the larger stack. In addition, temperature compensating buffer elements are provided having a temperature modulus of expansion complementary to that of the crystals and adjoining materials so as to minimize temperature generated stresses in the crystals which would otherwise tend to produce error signals in the output.

These and further objects and advantages of the invention will be more apparent upon reference to the following specification, claims, and appended drawings wherein:

FIGURE 1 is a vertical cross-section through an acceleration compensated pressure transducer constructed in accordance with the present invention.

FIGURES 2, 3 and 4 are cross-sections taken along lines 2—2, 3—3, and 4—4, respectively, of FIGURE 1.

Figure 2:
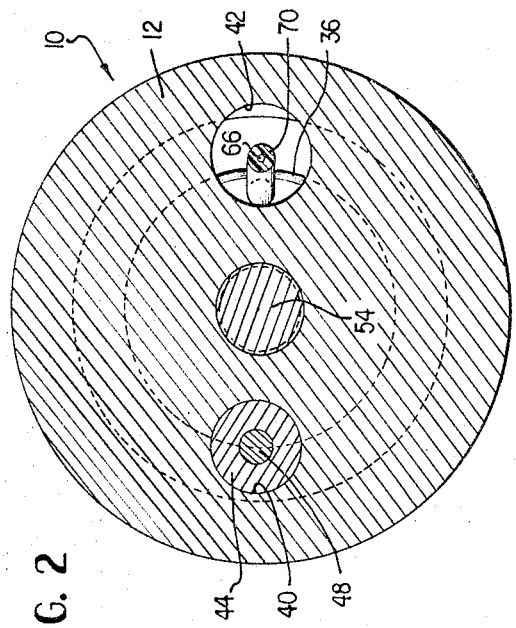
Figure 3:
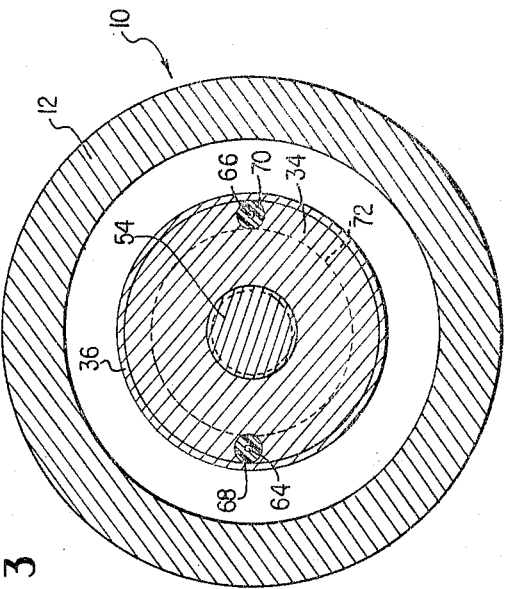

Referring to the drawings, and particularly to FIGURES 1–4, there is shown a piezoelectric pressure transducer constructed in accordance with the present invention generally indicated at 10 and including a cylindrical housing 12 closed off at its lower end by a flexible metallic diaphragm 14 made of stainless steel or other flexible material. Diaphragm 14 is suitably joined at its outer annular edge to the lower end of housing 12 and at its center to the base 16 of a stainless steel pre-loading sleeve 18. The device is sensitive to axial pressure forces indicated by the arrows 20 exerted along the line of its central longitudinal axis 22.

Pre-loading sleeve 18 forms the enclosure for what will hereinafter be referred to as a quartz crystal module generally indicated at 24 and which also includes a lower support and buffer mass 26, a first stack of quartz crystal wafers 28, a seismic mass of relatively dense material 30, a second quartz crystal wafer stack 32 and a module base 34. Pre-loading sleeve 18 is provided with relatively thin walls and is stressed when the device is assembled to provide a compression pre-load to the quartz crystal stacks 28 and 32. The upper thickened end 36 is preferably sealed by heliarc welding or the like to the module base 34 so as to close off the interior of the module and seal it against the surrounding environment.

The upper end of the housing 10 is closed off by the integral end portion or housing base 38 provided with a pair of apertures 40 and 42 receiving with a friction fit the insulating sleeves or plugs 44 and 46, respectively. Plug 44 has threaded through its center a male connector 48 while plug 46 is similarly provided through its center with a female connector 50. An output electrical signal from the transducer is developed across the terminal ends of connectors 48 and 50. Base 38 of the housing is also provided with a central aperture 52 receiving the threaded shank of a screw 54. The extreme inner end of the screw is threaded into the interior of the module base 34 which is provided with a suitable central threaded aperture 56 for that purpose. Screw 54 serves to attach and secure the module assembly 24 to the base 38 of the housing.

Figure 1:
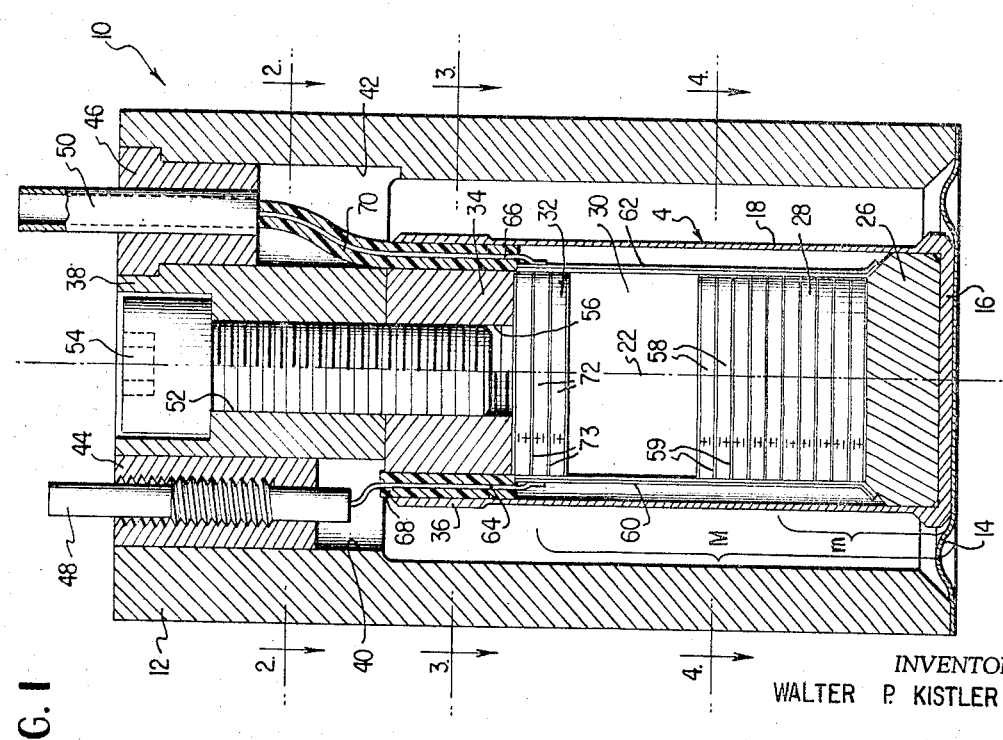

As illustrated in FIGURE 1, the quartz crystal wafers 58 of the first stack 28 are arranged in pairs such that adjacent edges of the crystals develop an electrical charge of like polarity. The crystals are separated in a conventional manner by suitable electrodes 59 such as copper discs or silver coating on the crystals themselves so as to collect the developed charge and couple it through suitable tabs on the end of each electrode to one of the two signal conductors 60 or 62. For example, conductor 60 which is of elongated flat configuration running up one edge of the crystal stack may be connected to the electrodes 59 between adjacent negative charge developing surfaces of the crystals 58 in stack 28 while the opposite conductor 62 of similar construction and configuration is connected to the tabs on those electrodes 59 contacting positive charge developing surfaces of the quartz crystals. These two conductors are electrically connected at their upper ends to signal leads 64 and 66 passing through insulator sleeves 68 and 70, respectively, friction fit within suitable apertures or grooves in the outer edge of module base 34. Signal lead 64 connects to male terminal 48 whereas signal lead 70 connects to female terminal 50.

The second stack of quartz crystal wafers 32 comprising individual wafers 72 are of identical construction to the wafers 58 in the first stack and are similarly separated by suitable electrodes 73 such as copper discs or silver coatings in a well-known manner. However, in the case of the second stack 72 the tabs on the electrodes 73 spacing the wafers are connected such that charges of opposite polarity are supplied to each of the signal leads 64 and 66 as compared to the polarity of charge derived from the wafers of first stack 28. Thus, the charges from the second or rear stack of quartz wafers 32 is such as to cancel out or oppose a portion of the charge signal derived from the first stack 28.

The embodiment of the invention ilustrated in FIGURE 1 includes a first stack of quartz wafers 28 incorporating some ten individual wafers 58, whereas the second stack 32 is provided with three identical wafers 72. It will be apparent that when a pressure force is applied to the diaphragm 14, this force is exerted uniformly on all the wafers of both stacks so that the output pressure signal is in effect equal to the charge developed by seven piezoelectric wafers, the charge of the remaining three wafers in stack 28 having been cancelled out by the opposite polarity charge signal developed by the three wafers in stack 32. However, when subjected to inertial forces such as those resulting from accelerations or vibrations, the magnitudes of the inertial forces acting on the two wafer stacks is different and by proper selection of the module masses can be made to produce signals from the two stacks which are of equal magnitude and which therefore cancel each other out.

The total seismic or inertial mass acting on the wafer stack 32 is illustrated by the bracket M in FIGURE 1 and consists of the mass of the diaphragm, the base of sleeve 18, support mass 26, the mass of wafer stack 28, seismic mass 30, and half the mass of the stack 32. For an axial vibration or acceleration force in the direction of the arrows 20 in FIGURE 1, the inertial mass acting on the wafer stack 28 is much less, as indicated by the bracket $m$ in FIGURE 1 and comprises simply the diaphragm, the base of sleeve 28, the support mass 26, and half of wafer stack 28. In order to provide complete acceleration signal cancellation for the 10–3 crystal wafer ratio illustrated, seismic mass 30 is chosen to have such a size that the total seismic mass acting on wafer stack 32 is approximately 3⅓ times the total seismic mass acting on wafer stack 28 or $3M=10m$. Since the inertial force is proportional to the total seismic mass times the acceleration $g$ (which acceleration is the same for both stacks) the force acting on stack 32 is approximately 3⅓ times the magnitude of the force acting on stack 28 so that each of the crystals 72 generates a total charge approximately 3⅓ times the total charge generated by each of the crystals 58. Since 3 times 3⅓ is equal to 10 times 1, it can be seen that the total charge generated by stack 32 will be equal in magnitude but opposite in polarity to the charge generated by stack 28 so that the output charge signal due to seismic forces, i.e., accelerations and vibrations, will be cancelled out at the output terminals 48 and 50 of the transducer.

Figure 5:
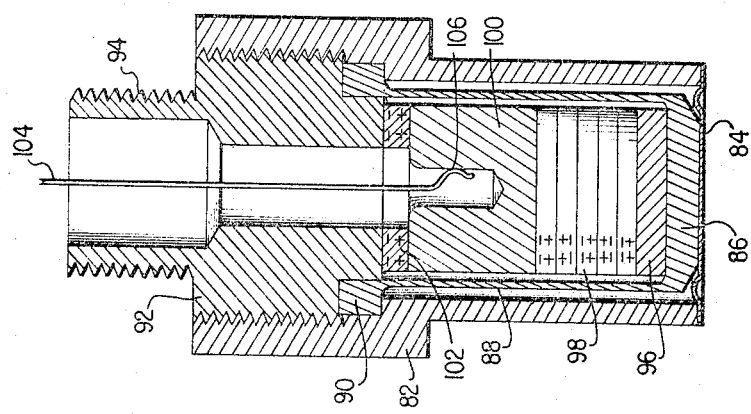
FIGURE 5 is a similar vertical cross-section through a second embodiment of the present invention incorporating both acceleration and temperature compensation.
Figure 4:
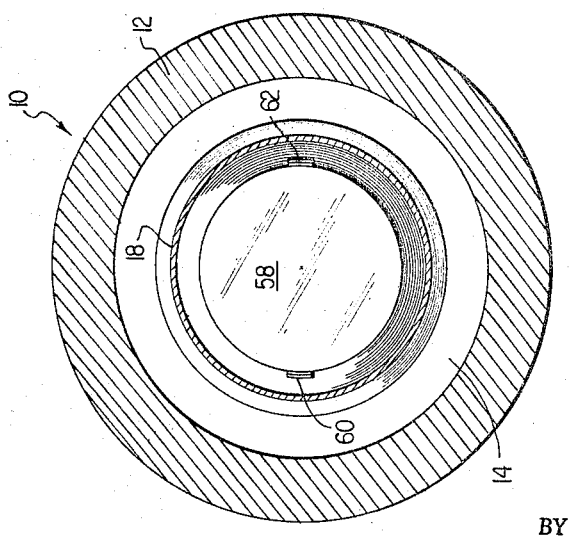

FIGURE 5 shows a modified embodiment of the pressure transducer of the present invention incorporating both seismic and temperature compensation. In this embodiment the unit again comprises a housing 82 which has secured to its lower end a flexible stainless steel or other suitable metal diaphragm 84. Secured to the diaphragm is the base 86 of a pre-loading sleeve 88 which has its enlarged upper annular end 90 tightly secured between the upper end of housing 82 and a threaded metal base or plug 92. The upper end of plug 92 is provided with a threaded coaxial cable signal lead terminal coupling 94.

Resting on base 86 of pre-loading sleeve 88 is a temperature compensating mass or wafer 96 which bears against a first crystal stack 98 composed of some five quartz crystal wafers as illustrated, but in all other respects similar to stack 28 of FIGURE 1. This first crystal stack 98 is separated by a seismic mass 100 (which, as more fully described below, also provides temperature compensation) from a second quartz crystal wafer stack 102 which as illustrated comprises a single wafer. Wafer 102 is as previously described connected in opposition to the output of lower or first stack 98. In this embodiment the housing 82 and threaded terminal 94 constitute one side of the signal output, i.e., the grounded side, whereas the live side of the output is adapted to be taken by way of the central conductor 104 of a coaxial cable passing through connector 94 and electrically contacting the conductive central mass 100, as diagrammatically illustrated at 104.

In the embodiment of FIGURE 5 the size of mass 100 is chosen such that the total seismic mass for accelerations and vibrations acting on quartz wafer 102 is five times the total seismic mass acting on the stack 98 so that the total charge produced from wafer 102 is equal in magnitude and opposite in polarity to the total charge produced by wafer stack 98 for acceleration forces. It is apparent that for pressure forces deflecting diaphragm 84 along the longitudinal axis the forces applied to all crystals are the same so that the effective output signal is equal to the total charge signal produced by four of the crystal wafers, with the charge produced by the fifth wafer of stack 98 cancelled out by the charge signal from wafer 102.

It is an important feature of the embodiment of FIGURE 5 that during assembly the center of acceleration compensation mass 26 is bored out so as to adjust its size to produce optimum cancellation of acceleration signals. This mass can be in the first instance slightly oversized and the entire unit placed upon a vibrating table so as to ascertain how much material must be drilled out and removed from the mass so as to provide exact cancellation.

In addition to acting as an acceleration compensating seismic mass, element 100 also in the embodiment of FIGURE 5 provides for temperature compensation in the transducer. In the preferred embodiment this mass consists of a material which has a coefficient of thermal expansion of about $14.0 \times 10^{-6}$. The temperature compensation action of the seismic mass 100 as well as that of the mass or wafer 96 at the other end of quartz stack 98 may be best understood from a consideration of FIGURES 6 and 7 illustrating the effects of temperature on a standard cut quartz crystal piezoelectric wafer.

Figure 6:
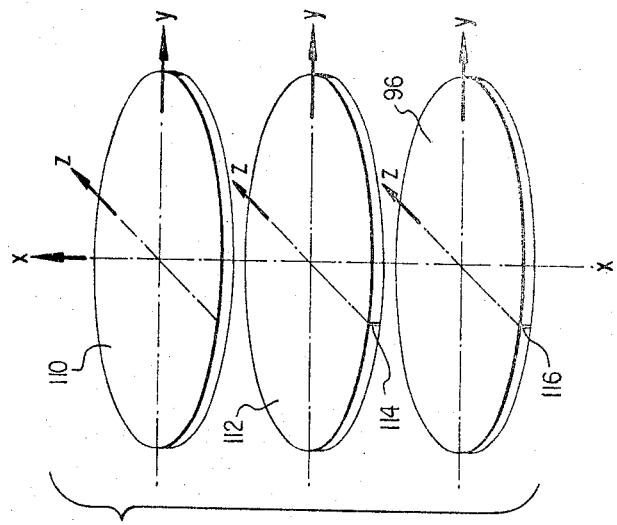
FIGURE 6 is an exploded view showing two quartz plates and a buffer plate of the transducer as they are cut out from the crystal axes, at normal temperatures.
Figure 7:
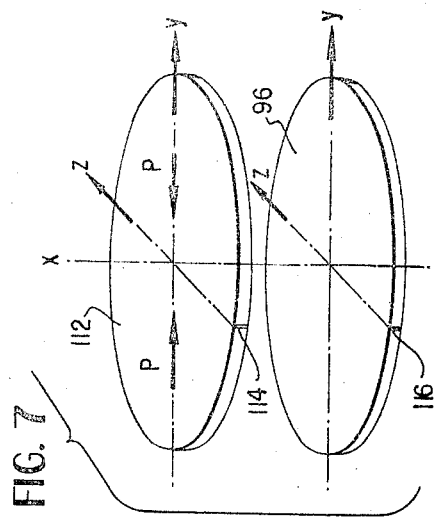
FIGURE 7 is an exploded view showing two of the plates of FIGURE 6 as having expanded at higher temperatures.

FIGURE 6 shows two quartz wafers 110, 112 which are of identical construction and which may represent any one of the standard wafers previously described, either in conjunction with the embodiment of FIGURE 1 or that of FIGURE 5. Also shown is compensating mass 96 similarly made of quartz in the manner of wafers 110 and 112. These wafers are conventionally cut so as to have two electrically active axes X and Y at right angles to each other and a third optical axis Z perpendicular to the aforementioned axes. As is well known the thermal coefficient of expansion $\alpha$ (linear coefficient per degree centigrade) along the electrically sensitive acceleration axis X is approximately $14.0 \times 10^{-6}/°$ C. for the quartz crystal, and similarly along the other electrically active axis Y. However, along the third perpendicular or optical axis the coefficient of thermal expansion $\alpha$ of the quartz wafers is approximately $8.0 \times 10^{-6}/°$ C. Thus, when the quartz crystals are subjected to elevated temperatures they tend to swell or expand in a non-uniform manner so as to assume the enlarged elliptical shapes illustrated for the crystals 110 and 96 in FIGURE 7. More specifically, the expansion along the Y axis of the crystals is much greater, i.e., almost twice the expansion along the Z axis for a given increase in temperature.

This expansion is normally resisted by the squeezing force of the pre-loading sleeve 18 of FIGURE 1 or 88 of FIGURE 5 which may provide a pre-load of as much as several hundred g's to the quartz crystals and their associated metallic elements. As a result radially directed forces P as illustrated in FIGURE 7 are produced, which forces when acting along the Y axis, contribute to the charge developed on the two opposite flat surfaces of the crystal, namely, those developed along the X axis, and which would normally constitute error signals at the output. Thus, even if the adjacent masses such as masses 100 and 96 in FIGURE 5 have a uniform coefficient of thermal expansion these forces producing error signals will be applied to the quartz plate if the thermal expansion of the adjacent elements even though uniform is less than $14 \times 10^{-6}$.

Therefore, in order to avoid or minimize these temperature produced shearing forces, the temperature compensating plate or wafer 96 is arranged in front of the quartz pack 98 and in the preferred embodiment consists of the same quartz material as each of the wafers and is cut out in exactly the same manner as the other wafers. However, to make sure that this plate 96 does not produce any electrical charge it is completely metallized or completely covered with a conductive metal coating. Furthermore, to ensure that the Y axes of this plate 96 and all the plates of the stack 98 are exactly aligned they are preferably provided with scratch marks such as are indicated at 114 and 116 in FIGURE 7.

The seismic mass 100 preferably consists of a material which has a coefficient of thermal expansion $\alpha$ of at least $14.0 \times 10^{-6}$, i.e., at least equal to the thermal expansion of the quartz crystal along its Y or electrically active transverse axis. By using such a material no radial shear along the Y axis is produced. Some shear force along the Z axis does occur, but this is the optical axis and is electrically inactive so that no charges are produced. For effective temperature compensation a dense conductive steel having a linear coefficient of thermal expansion per degree centigrade of $14.0 \times 10^{-6}$ is best suited for mass 100. The temperature compensation achieved with such a mass and with the metallized quartz wafer 96 is almost 100% effective. Preferably the surfaces of these two temperature compensating masses are roughened to avoid slippage so as to further reduce the likelihood of error signals. Materials other than steel may be utilized for the mass 100 and additionally the mass may consist of a plurality of elements either of the same or of different materials. The primary requirement for the mass 100 is that it have sufficient density so as to provide the desired acceleration compensation for cancelling out the electric signal and that it have a coefficient of thermal expansion along the Y axis approximately equal to that of the adjacent quartz plate. This of course can be accomplished by providing a combination of elements such as a central element of very dense material like tungsten with an aluminum or some other lighter weight element on each side having a coefficient of thermal expansion more nearly approaching that of the quartz.

It is apparent from the above that the present invention provides a novel piezoelectric transducer having either acceleration compensation, temperature compensation or both. The unit is of relatively small size and of inexpensive construction, and is substantially insensitive to seismic forces acting along its longitudinal axis and to excessive error signals produced by large temperature changes. While described in conjunction with a pressure transducer, it is apparent that the compensation features of this invention are also applicable to other types of piezoelectric transducers, for example the acceleration and temperature compensation both find utility in piezoelectric force gages and the temperature compensation is readily applicable to the similar piezoelectric accelerometers.

The device of the present invention importantly improves over other known transducers which lack the rapid response and wide frequency range of the device of this invention while at the same time providing a small size, light weight, and relatively inexpensive unit. Since the two crystal packs described are separated by a seismic element of suitable mass to provide complete compensation rather than by a structural element as in many prior constructions, the unit is not subject to the phase problem of the prior constructions in which the signals produced by the two piezoelectric stacks, while of equal magnitude, are not opposite in phase for high frequency signals, thus limiting the dynamic range of prior constructions. Similarly, all the quartz wafers of the present invention may be of similar standard construction requiring no special cutting or tuning. The unit further permits the application of pre-loading forces of several hundred and even several thousand g's by means of a sealed pre-loading sleeve, preferably of suitable metal such as stainless steel or the like. While described in conjunction with the preferred embodiments utilizing quartz as the piezoelectric material, it is apparent that the present invention has similar application to other conventional piezoelectrics such as the piezoelectric ceramics.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A piezoelectric transducer comprising a first piezoelectric means including at least one piezoelectric wafer, second piezoelectric means including a plurality of piezoelectric wafers, said first piezoelectric means producing a smaller output signal than said second piezoelectric means for a given force, a seismic mass between said first and second piezoelectric means, a base adjacent said first piezoelectric means, and a preloading sleeve acting between said base and said second piezoelectric means for urging both said piezoelectric means and said seismic means toward said base.

2. A transducer according to claim 1 wherein the ratio of the total seismic mass acting on said first piezoelectric means to the total seismic mass acting on said second piezoelectric means is the inverse of the ratio of the number of piezoelectric wafers in said first piezoelectric means to the number of piezoelectric wafers in said second piezoelectric means.

3. A piezoelectric transducer comprising first and second piezoelectric means, said means having a different electrical output response to a given force, seismic mass means acting on each of said piezoelectric means, the ratio of the seismic masses acting on said first and second piezoelectric means being inversely proportional to said responses, and means for combining the electrical outputs of said first and second piezoelectric means in phase opposition.

4. A piezoelectric pressure transducer comprising a housing having a base at one end and a pressure sensitive diaphragm at the other end, a module positioned between said base and diaphragm and including a seismic mass sandwiched between two aligned stacks of piezoelectric wafers, there being a different number of wafers in each stack, means for combining the electrical outputs of said stacks in phase opposition, and a preloading sleeve urging said stacks and said seismic means toward said base, said diaphragm acting against the end of said sleeve.

5. A transducer according to claim 4 wherein said wafers are made of quartz.

6. A transducer according to claim 5 wherein said stack adjacent said base has three wafers and the other of said stacks has seven wafers.

7. A transducer according to claim 5 wherein said stack adjacent said base has one wafer and the other of said stacks has five wafers.

8. A piezoelectric transducer according to claim 4 comprising at least one piezoelectric element, and a mass adjacent said element having a coefficient of thermal expansion at least as great as the coefficient of thermal expansion of said element along an electrically active axis.

9. A transducer according to claim 8 wherein said element is quartz and said mass has a coefficient of thermal expansion $\alpha$ of at least about $14.0 \times 10^{-6}/°$ C.

10. A piezoelectric transducer according to claim 4 comprising at least one piezoelectric quartz wafer cut with its large surfaces perpendicular to one electrically active axis, a mass adjacent one of said large surfaces of said wafer, and means resiliently urging said mass toward said wafer, said mass having a coefficient of thermal expansion of at least $14.0 \times 10^{-6}/°$ C. in a direction parallel to the other electrically active axis of said wafer.

11. A piezoelectric transducer comprising first and second piezoelectric means, said means having a different electrical response to a given force, a seismic mass between said first and second means whereby the ratio of the total seismic mass acting on said first and second means is inversely proportional to said responses, means for coupling the electrical outputs of said first and second means in phase opposition, a base, and means resiliently urging said first and second means and said seismic mass toward said base, said seismic mass having a coefficient of linear thermal expansion per degree centigrade of at least about $14.0 \times 10^{-6}$.

12. A pressure transducer comprising first and second stacks of piezoelectric wafers, a seismic mass of relatively dense material sandwiched between said stacks, said first stack having a lesser number of wafers than said second stack, means for deriving output signals of opposite polarity from said stacks, a base adjacent said first stack, a temperature compensating mass adjacent said second stack, a preloading sleeve acting between said base and said compensating mass to preload said stacks under compression, and a resilient diaphragm acting in response to pressure against one end of said sleeve, said seismic mass and said compensating mass each having a temperature coefficient of expansion $\alpha$ of about $14.0 \times 10^{-6}/°$ C. at least in a direction parallel to an electrically active axis of said wafers.

13. A transducer according to claim 12 wherein said wafers are quartz and said seismic mass is steel.

14. A transducer according to claim 13 wherein said compensating mass is a metallized quartz wafer aligned with the wafers in said stacks.

References Cited

UNITED STATES PATENTS

| | | | |
|---|---|---|---|
| 1,902,184 | 3/1933 | Rieber | 310—8.4 |
| 2,514,297 | 7/1950 | Smith | 310—8.4 |
| 2,988,728 | 6/1961 | Marlow | 310—8.6 |
| 3,034,001 | 5/1962 | King | 310—9.2 |
| 3,151,487 | 10/1964 | Schuck | 310—8.4 |
| 3,269,175 | 8/1966 | Sprosty | 310—8.7 |
| 3,281,613 | 10/1966 | Hatschek | 310—8.7 |

MILTON O. HIRSHFIELD, *Primary Examiner.*

J. D. MILLER, *Examiner.*